(12) United States Patent
Murray

(10) Patent No.: US 6,484,033 B2
(45) Date of Patent: Nov. 19, 2002

(54) WIRELESS COMMUNICATION SYSTEM FOR LOCATION BASED SCHEDULE MANAGEMENT AND METHOD THEREFOR

(75) Inventor: Bradley A. Murray, West Palm Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 52 days.

(21) Appl. No.: 09/728,144

(22) Filed: Dec. 4, 2000

(65) Prior Publication Data

US 2002/0068583 A1 Jun. 6, 2002

(51) Int. Cl.[7] .................................................. H04Q 7/20
(52) U.S. Cl. ....................................... 455/456; 455/466
(58) Field of Search ................................. 455/414, 422, 455/432, 433, 456, 457, 466; 701/200, 201, 204; 342/450, 357.01

(56) References Cited

U.S. PATENT DOCUMENTS

| | | | |
|---|---|---|---|
| 4,872,005 A | | 10/1989 | DeLuca et al. |
| 5,790,974 A | | 8/1998 | Tognazzini |
| 5,900,825 A | | 5/1999 | Pressel et al. |
| 5,946,611 A | | 8/1999 | Dennison et al. |
| 6,125,281 A | * | 9/2000 | Wells et al. ................. 455/422 |
| 6,263,209 B1 | * | 7/2001 | Reed et al. .................. 455/456 |
| 6,295,449 B1 | * | 9/2001 | Westerlage et al. ......... 455/422 |

* cited by examiner

Primary Examiner—Nay Maung
(74) Attorney, Agent, or Firm—Randi L. Dulaney

(57) ABSTRACT

A wireless communication system for location based schedule management (10) includes a plurality of wireless communication devices (40), including a wireless communication device (32) and a backup wireless communication device (47); a system controller (24) for generating a message; a RF transmitter (26) for transmitting the message (34) to the plurality of wireless communication devices (40); and an application server (76). The application server (76) includes a server memory (152) for storing an event location (134) and one or more event criteria parameters (129), a server processor (150) for processing a current location (122) of the wireless communication device (32); and a server event management application (82) for comparing the current location (122) with the event location (134). The server processor (150) sends a server command (84) to the system controller (24) in response to the comparison of the current location (122) and the event location (134) exceeding the event criteria parameters (129). The system controller (24) sends an update message (36) to the backup wireless communication device (47) in response to the server command (84).

9 Claims, 11 Drawing Sheets

FIG. 10

| | | | |
|---|---|---|---|
| EVENT REMINDER | | | |
| DATE | SEPT ▼ | 21 ▼ | 2000 |
| EVENT | TOM WEISS RETIREMENT LUNCHEON | START TIME | 12:00  PM ▼ |
| LOCATION | BAIN HOTEL BALL ROOM A | END TIME | 2:00  PM ▼ |
| LONGITUDE | 82.35  LATITUDE  28.14 | AVG. SPEED | 45 MPH |
| ALERT TIME | 30 MIN. ▼ | CONTACT'S PHONE # | 561-324-2448 |
| BACKUP #1 NAME | PETER JOSEPH | BACKUP #1 PHONE # | 561-968-2703 |
| BACKUP #2 NAME | CINDY JOHNSON | BACKUP #2 PHONE # | 561-639-7444 |
| BACKUP #3 NAME | MIKE ELLIS | BACKUP #3 PHONE # | 561-223-5500 |

WIRELESS COMMUNICATION SYSTEM FOR LOCATION BASED SCHEDULE MANAGEMENT AND METHOD THEREFOR

BACKGROUND OF THE INVENTION

1. Field of the Invention

This invention relates in general to wireless communication systems and in particular to wireless communication systems for schedule management through communication to one or more wireless communication devices.

2. Description of the Related Art

At present, when a person has an event to attend in the future such as a meeting, appointment, or luncheon, the person typically records the details of the event as an entry in a calendar which may be, for example on a desktop PC. These details can include the date, time, and location of the event along with an alert. The alert is set to remind the user at a predetermined time before the event is to begin.

Recently, designers of portable wireless communication devices (i.e. cellular phones, pagers, and palm top computers) are including software applications, which emulate desktop PC software applications in their products. These software applications can enable users to keep track of their schedules while away from their desk, such as while traveling. The software application in the portable wireless communication device can include a calendar system or event reminder based upon the time. Specifically, a future event having a future time can be identified and stored. A comparison of the current time and the stored future time determines when to provide an indication such as an alert to the user that the identified future event is approaching. This allows the user sufficient time to prepare for or travel to a specific location where the future event will take place.

One disadvantage to a time based event reminder is that the user must determine how far in advanced of a future event the user should be reminded of the future event. For example, a user must decide today that, for a meeting that will occur next month, a 10-minute advance notice will be a sufficient amount of time to prepare for or travel to the location of the event. However, when the user finds he is physically located too far from the location of the future event so that the 10 minute advance notice would not allow enough time to travel to the location of the scheduled event, the user will not arrive at the event in time. Given that one month has passed since the event was originally entered in the event reminder, there could be several different factors that could cause the user to be delayed or miss the event all together when the original advance notice is utilized. For example, reasons could include unexpected traffic delays, sudden illness, car trouble or the user forgetting about the future event until being reminded just minutes before the event is to occur. Therefore, time based event reminders may not provide sufficient notification for the event.

Additionally, once a user has determined that the upcoming scheduled event cannot be attended on time, the user may desire that another associate attend the scheduled event in place of themselves. This requires the user to contact numerous alternative associates to determine if they are in a location which allows them to attend the scheduled event on time and subsequently provide the details of the event (i.e. location, subject matter, etc). The user may also desire to inform a contact person located at the upcoming scheduled event location that he/she may not be able to attend the event on time. This requires a user to determine the appropriate contact information for the upcoming scheduled event and initiate a call or message to be sent to the contact person.

Another disadvantage of existing reminder methods is that changes to the user's calendar must be made manually. That is, when the event is canceled or postponed and the user's assistant is notified of the change, the event entry in the calendar must then be manually updated by the assistant or by the user to reflect the change. When the user stores the calendar and associated notifications on a portable wireless communication device the calendar system located in the portable wireless communication device must also be updated. When the assistant makes any additional changes to the user's schedule, adding another event in the original event's place, the original calendar, for example located on a desktop PC, again must be updated and the user must be notified of the change. This may not be easily accomplished. When, for some reason, the assistant is not able to reach the user, then the user's portable calendar will not be manually updated and the new event may be missed.

Recently portable wireless communication devices include the capability to determine current location. For example, a wireless communication system can use well-known direction and location-finding techniques at each base station site in order to fix the location of the portable wireless communication device. The current location can be computed by triangulation when two or more transmitter base stations receive the same signal or by any other well-known technique. Once the portable wireless communication device's location is determined, it may be used along with current traffic data, as in the previous case, to calculate the user's travel times and the distance to a particular point of interest.

Similarly, the portable wireless communication device can include a Global Positioning System (GPS) receiver for determining its current location. The Global Positioning System (GPS) is a worldwide radio-navigation system formed from a constellation of twenty-four (24) satellites and their ground stations. GPS uses satellites as reference points to calculate positions accurate to a matter of meters.

Therefor, what is needed is a system and method for schedule management, which includes a user's current location and the location of the future event.

BRIEF DESCRIPTION OF THE SEVERAL VIEWS OF THE DRAWINGS

FIG. 10 is one embodiment of a display of information recorded for an event for use within the wireless communication device of FIGS. 2 and 3;

DETAILED DESCRIPTION OF THE INVENTION

Figure 1:
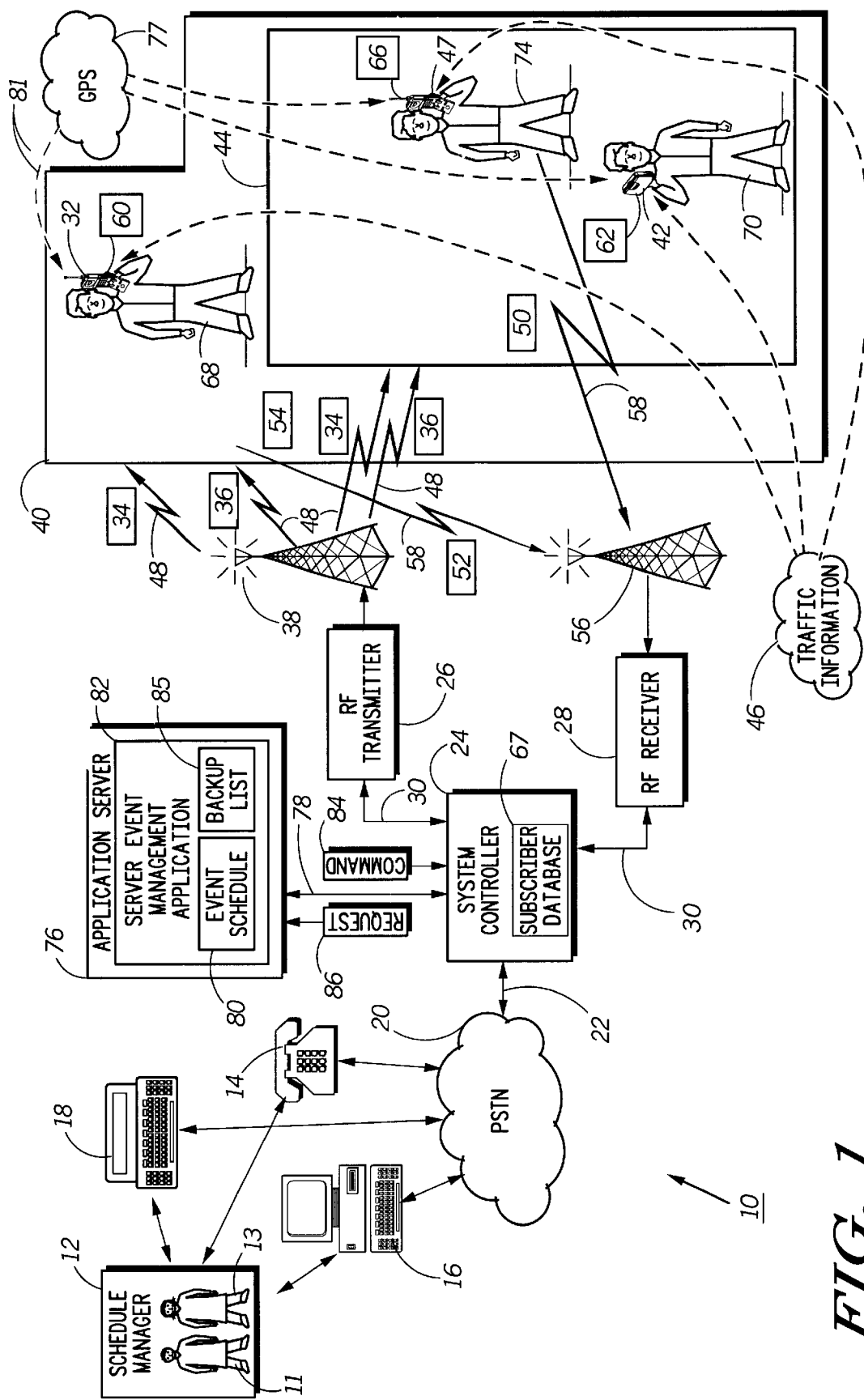
FIG. 1 is an electronic block diagram of a wireless communication system.

Referring to FIG. 1, an electronic block diagram of a wireless communication system 10 for location based schedule management is shown. The wireless communication system 10 includes a message input device for receiving commands from a schedule manager 12 such as an original user 11 or an system administrator 13 and, in response, initiating messages into the wireless communication system 10. The message input device can be, for example, a telephone 14, a computer.16, or a desktop messaging unit 18, connected through a conventional public switched telephone network (PSTN) 20 through a plurality of telephone links 22 to a system controller 24. The telephone links 22, for example, can be a plurality of twisted wire pairs, a fiber optic cable, or a multiplexed trunk line.

The system controller 24 is coupled to and oversees the operation of at least one radio frequency (RF) transmitter 26 and at least one radio frequency (RF) receiver 28 through one or more communication links 30. The communication links 30 typically are twisted pair telephone wires, and additionally can include radio frequency (RF), microwave, or other communication links. The radio frequency transmitter 26 and the radio frequency receiver 28 typically are used with message store and forward stations that encode and decode inbound and outbound messages into formats that are compatible with landline message switched computers and personal radio addressing requirements, such as cellular messages, short messaging service, or paging protocols. The system controller 24 can also function to encode and decode wireless messages that are transmitted to or received by the radio frequency transmitter 26 or the radio frequency receiver 28. Telephony signals are typically transmitted to and received from the system controller 24 by telephone sets such as the telephone 14 or a wireless communication device 32. The system controller 24 encodes and schedules outbound messages such as a message 34 or an update message 36. The system controller 24 then transmits the encoded outbound messages through the radio frequency transmitter 26 via a transmit antenna 38 to a plurality of wireless communication devices 40 such as a wireless communication device 32, or a plurality of standby wireless communication devices 44 including the backup wireless communication device 47 or a second backup wireless communication device 42 on at least one outbound radio frequency (RF) channel 48. The message 34 can be, for example, a data message or a voice call. Similarly, the system controller 24 receives and decodes inbound messages such as a reply message 50, a query message 52, or a change notification message 54 received by the radio frequency receiver 28 via a receive antenna 56 on at least one inbound radio frequency (RF) channel 58 from one of the plurality of wireless communication devices 40. The reply message 50, the query message 52, or the change notification message 54 can be, for example, a data message, a reply to a data message, a voice call, or a reply to a voice call.

It will be appreciated by one of ordinary skill in the art that the wireless communication system 10, in accordance with the present invention, can function utilizing any wireless RF channel, for example, a one or twoway pager channel, a mobile cellular telephone channel, or a mobile radio channel. Similarly, it will be appreciated by one of ordinary skill in the art that the wireless communication system 10 can function utilizing other types of communication channels such as infrared channels. In the following description, the term "wireless communication system" refers to any of the wireless communication systems mentioned above or an equivalent.

Similarly, it will be appreciated by one of ordinary skill in the art that the wireless communication device 32, the backup wireless communication device 47, and the second backup wireless communication device 42 in accordance with the present invention, can be a mobile cellular telephone, a mobile radio data terminal, a mobile cellular telephone having an attached data terminal, or a two way pager, such as the "Pagewriter 2000X" manufactured by Motorola Inc. of Schaumburg, Illinois. In the following description, the term "wireless communication device" refers to any of the devices mentioned above or an equivalent.

The wireless communication device 32 assigned for use in the wireless communication system 10 has an address 60 or identity assigned thereto which is a unique selective call address in the wireless communication system 10. Similarly, the backup wireless communication device 47 has a backup address 66 assigned thereto which is unique selective call address in the wireless communication system 10. It will be appreciated by one of ordinary skill in the art that other wireless communication devices assigned for use in the wireless communication system 10 have an address assigned thereto which is a unique selective call address in the wireless communication system 10.

The address 60 enables the transmission of the message 34 from the system controller 24 only to the wireless communication device 32 having the address 60, and identifies the messages and responses received at the system controller 24 from the wireless communication device 32 with the address 60. In one embodiment, each of the plurality of. wireless communication devices 40 also has a pin number assigned thereto, the pin number being associated with a telephone number within the PSTN 20. A list of the assigned addresses and correlated telephone numbers for each wireless communication device 32 is stored in the system controller 24 in the form of a subscriber database 67.

The wireless communication system 10 receives traffic information 46 via a connection to the internet, for example, or wirelessly received from a separate communication system (not shown). Traffic information 46 includes well known traffic monitoring services which provides traffic conditions, including any known traffic delays. The traffic information 46 can be periodically broadcasted or broadcasted on command to the plurality of wireless communication devices 40 or by the wireless communication system 10.

A device user 68 interacts with the wireless communication device 32 and utilizes it as a means of communication. Similarly, a backup device user 74 interacts with the backup wireless communication device 47 and utilizes it as a means of communication.

In a preferred embodiment of the present invention, the wireless communication system 10 includes an application server 76 coupled to the system controller 24 via a server interface 78. The application server 76 controls and manages communication of the update message 36 to the plurality of wireless communication devices 40 in response to location information and a multitude of unscheduled and scheduled events by sending wireless messages to the plurality of wireless communication devices 40. The application server 76 manages an event schedule 80 of which the plurality of device users is reminded on a particular day or time, facilitating management of the group of device users through communication with the plurality wireless communication devices 40. The application server 76 receives position and location information of the plurality of wireless communication devices 40 via a reply message 50 or included within any other inbound transmission message. The plurality of wireless communication devices 40 calculate their position utilizing signals 81 broadcast from a GPS system 77 in a manner well known in the art. In one embodiment, the application server 76 receives inputs from the system administrator 13. Preferably, the application server 76 includes a server event management application 82. The server event management application 82 manages the event schedule 80 including a plurality of events of which the device user 68 can be reminded on a particular day and time. It will be appreciated by one of ordinary skill in the art that the server event management application 82 can be a program or any other equivalent. The server event management application 82 preferably includes a backup list 85. The backup list 85 includes information on possible backup attendees for the plurality of events. The application server 76 communicates the event schedule 80 and any associated information, tasks, or changes by sending a server command 84 via the server interface 78 to the system controller 24. The system controller 24, upon receipt of the server command 84 from the application server 76, transmits the event schedule 80, task, or change to the plurality of wireless communication devices 40. Further, the system controller 24 communicates a system request 86 to the application server 76 via the server interface 78 for changes to the event schedule 80, responsibilities, the backup list 85, and other event features. It will be appreciated by one of ordinary skill in the art that the changes communicated to the application server 76 can be any of those mentioned above or an equivalent. The addition of the application server 76 to the wireless communication system 10 enhances the operation of the wireless communication system 10 by adding intelligence for the management of the event schedule 80 including the plurality of events for communication among and to the plurality of wireless communication devices 40.

Figure 2:
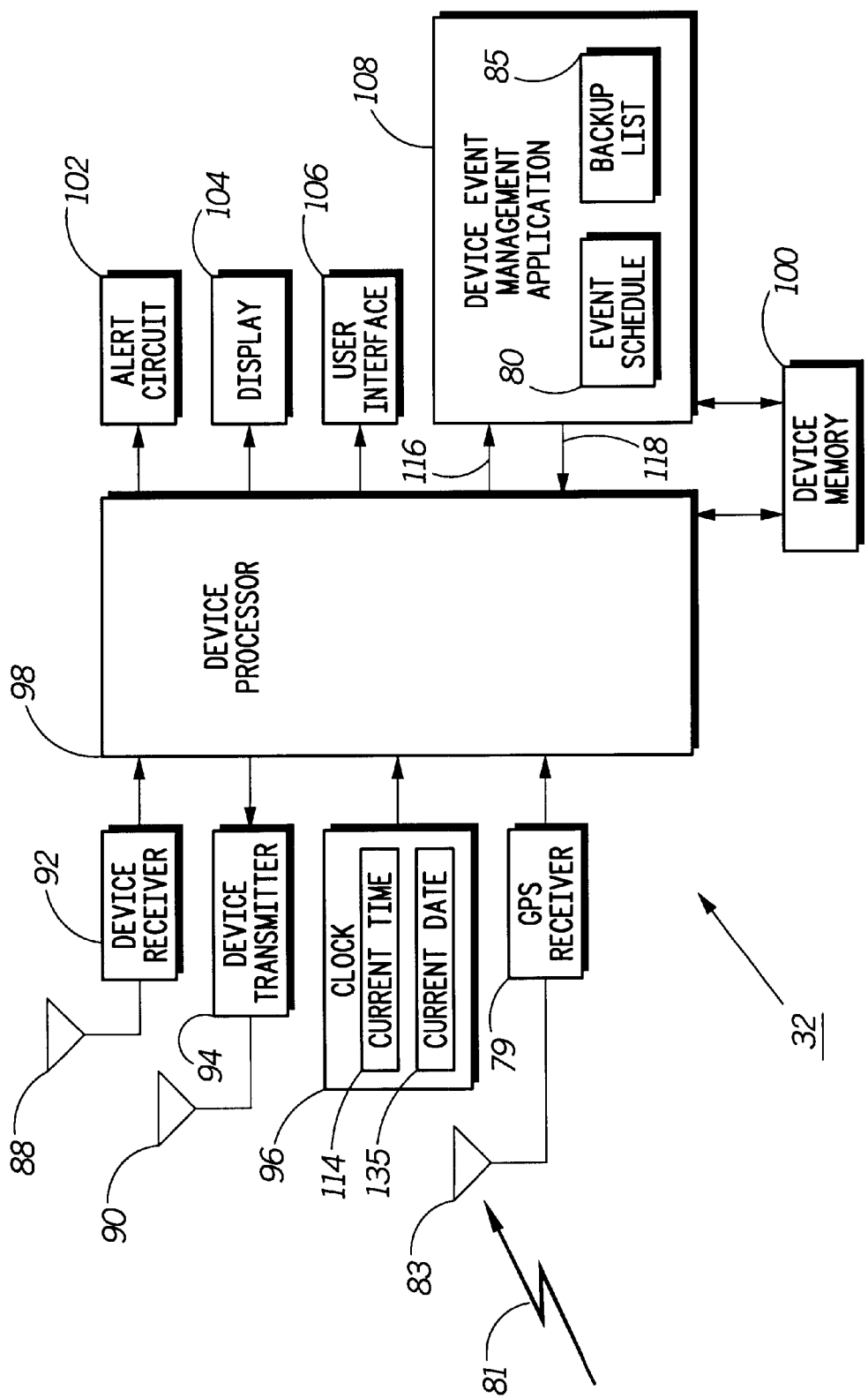
FIGS. 2 and 3 are electronic block diagrams of a wireless communication device for use within the wireless communication system of FIG. 1.
Figure 3:
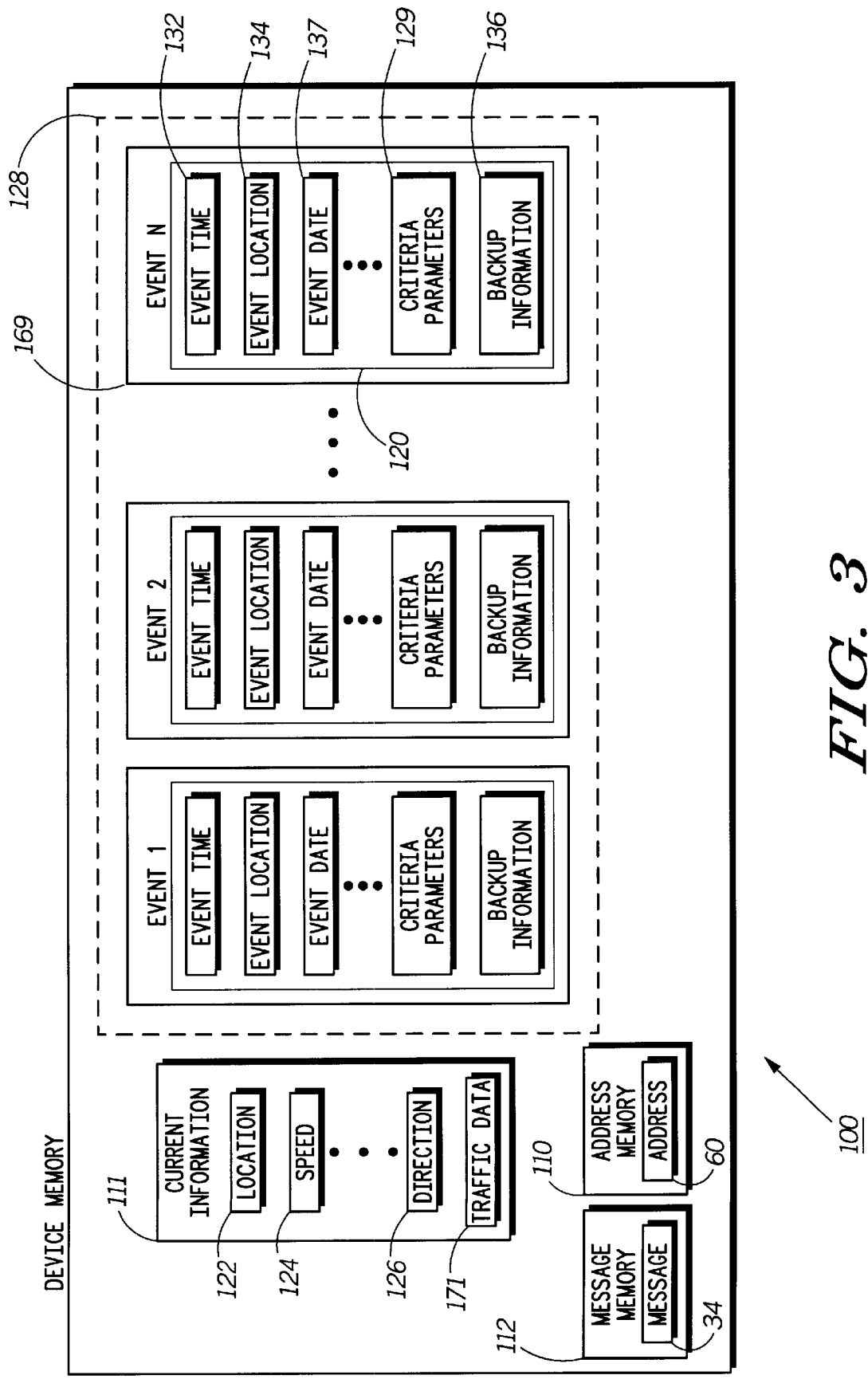

FIGS. 2 and 3 are electronic block diagrams of a preferred embodiment of the wireless communication device 32 for use within the wireless communication system 10. In this embodiment, the event schedule decisions are handled within the device rather than the application server 76. It will be appreciated by one of ordinary skill in the art that the electronic block diagram of FIGS. 2 and 3 are illustrative of each of the plurality of wireless communication devices 40 assigned for use in the wireless communication system 10 such as the wireless communication device 32, the backup wireless communication device 47, and the second backup wireless communication device 42.

Referring to FIGS. 2 and 3, the wireless communication device 32 includes a first device antenna 88, a second device antenna 90, a device receiver 92, a device transmitter 94, a clock 96, a GPS antenna 83, a GPS receiver 79, a device processor 98, a device memory 100, an alert circuit 102, a display 104, a user interface 106, and a device event management application 108. It will be appreciated by one of ordinary skill in the art that the device event management application 108 can be a program or any other equivalent.

The first device antenna 88 intercepts transmitted signals from the wireless communication system 10. The first device antenna 88 is coupled to the device receiver 92, which employs conventional demodulation techniques for receiving the communication signals transmitted by the wireless communication system 10 such as the message 34 and the update message 36 of FIG. 1.

Coupled to the device receiver 92, is the device processor 98 utilizing conventional signal processing techniques for processing received messages. Preferably, the device processor 98 is similar to the MC68328 micro-controller manufactured by Motorola, Inc. of Schaumburg, Illinois. It will be appreciated by one of ordinary skill in the art that other similar processors can be utilized for the device processor 98, and that additional processors of the same or alternative type can be utilized as required to handle the processing requirements of the device processor 98.

The device processor 98 decodes an address in the demodulated data of the received message, compares the decoded address with one or more addresses such as the address 60 stored in an address memory 110 of the device memory 100; and when a match is detected, proceeds to process the remaining portion of the received message.

To perform the necessary functions of the wireless communication device 32, the device processor 98 is coupled to the device memory 100, which preferably includes a random access memory (RAM), a read-only memory (ROM), and an electrically erasable programmable read-only memory (EEPROM)(not shown). The device memory 100 also includes the address memory 110, a current information 111, a message memory 112, and a plurality of events 128. The current information 111 includes a current location 122, a current speed 124, a current direction 126, and a traffic data 171. Traffic data 171 is received by each wireless communication device 32 from the signals transmitted by the traffic information 46 (FIG. 1), and is stored within the current information 111. Each event 169, within the plurality of events 128, contains event information 120. Event information 120 includes an event time 132, an event location 134, one or more event criteria parameters 129, and event backup information 136. The event location 134 information can take the form of a latitude and longitude of the where the event is to occur. The latitude and longitude coordinates can be obtained from a preexisting database of event locations which include the correct longitude and latitude for a specific event location. Alternately, the longitude and latitude of the event location 134 can be determined by previously visiting the event location 134 with a wireless communication device 32 and utilizing the GPS receiver 79 included within the wireless communication device 32 to calculate and store the location coordinates of the specific event location. The event criteria parameters 129 can include, for example, a travel time 173, an alert setting 175, and a limit 177 (see FIG. 4). It will be appreciated by one skilled in the art that other parameters may be included in the event criteria parameters 129 within the scope of the present invention. The limit 177 is a predetermined algorithm, a time of day for example, within the alert setting 175. The alert setting 175 can consist of a combination of the limit 177 and the alert 103. One skilled in the art will appreciate that other alerts or any combination of the audible, vibratory, and visual alerts described can be used for the alert setting.

Once the device processor 98 has processed a received message, it stores the decoded message in the message memory 112. It will be appreciated by one of ordinary skill in the art that the message memory 112, in accordance with the present invention, can be a voicemail box or a group of memory locations in a data storage device. In the following description, the term "message memory" refers to any of the memory means mentioned above or an equivalent.

Upon receipt and processing of a message 34, the device processor 98 preferably generates a command signal to the alert circuit 102 to notify the device user 68 (see FIG. 1) that the message 34 has been received and stored. The alert circuit 102 can include a speaker (not shown) with associated speaker drive circuitry capable of playing melodies and other audible alerts, a vibrator (not shown) with associated vibrator drive circuitry capable of producing a physical vibration, or one or more LEDs (not shown) with associated LED drive circuitry capable of producing a visual alert. It will be appreciated by one of ordinary skill in the art that other similar alerting means as well as any combination of the audible, vibratory, and visual alert outputs described can be used for the alert circuit 102.

Upon receipt of a message 34, the device processor 98 preferably also generates a command signal to the display 104 to generate a visual notification of the receipt and storage of the message 34. When the display 104 receives the command signal from the device processor 98 that the message 34 has been received and stored in the message memory 112, a message indication is displayed. The message indication, for example can be the activation of one of a plurality of message icons on the display 104. The display 104 can be, for example, a liquid crystal display utilized to display text. It will be appreciated by one of ordinary skill in the art that other similar displays such as dot matrix displays can be utilized for the display 104.

In one embodiment, the wireless communication device 32 includes the clock 96. The clock 96 provides timing for the device processor 98. The clock 96 can include a current time 114 and a current date 135 for use in the operation of the wireless communication device 32. The clock 96 also provides a source for timing of feature enhancements such as active and inactive periods of operation or periods of alerting.

In a preferred embodiment, the wireless communication device 32 includes the device event management application 108. The wireless communication device 32 performs event-scheduling functions within the device event management application 108 using a processor command 116 sent from the device processor 98. The device event management application 108 sends an application response 118 in reply to the processor command 116. The device event management application 108 preferably includes the backup list 85 and the event schedule 80. The device event management application 108 can be hard coded or programmed into the wireless communication device 32 during manufacturing, can be programmed over-the-air upon customer subscription, or can be a downloadable application. It will be appreciated by one of ordinary skill in the art that other programming methods can be utilized for programming the device event management application 108 into the wireless communication device 32.

The event schedule 80, received from the application server 76 of the wireless communication system 10 (see FIG. 1) identifies the device user 68 and the wireless communication device 32 for a particular event. In one embodiment, the device processor 98 receives the current time 114 from the clock 96 and sends the processor command 116 including the current time 114 to the device event management application 108. The device event management application 108 compares the value of the current time 114 to the event information 120 stored in the device memory 100 for the wireless communication device 32 as defined by the event schedule 80, and sends the application response 118 when there is a match.

Preferably, the user interface 106 is coupled to the device processor 98, as shown in FIGS. 2 and 3. The user interface 106 can be one or more buttons used to generate a button press, a series of button presses, a voice response from the device user 68, or some other similar method of manual response initiated by the device user 68 of the wireless communication device 32. The device processor 98, in response to the user interface 106, initiates the processor command 116 to the device event management application 108. The device event management application 108, in response to the processor command 116, performs various event functions as required. In this manner, the event schedule 80 can be altered directly by the user of the wireless communication device 32.The device transmitter 94 is coupled to the device processor 98 and is responsive to commands from the device processor 98. When the device transmitter 94 receives a command from the device processor 98 , the device transmitter 94 sends a signal via the second device antenna 90 to the wireless communication system 10 (see FIG. 1).

In an alternative embodiment (not shown), the wireless communication device 32 includes one antenna performing the-functionality of the first device antenna 88 and the second device antenna 90. Further, the wireless communication device 32 alternatively includes a transceiver circuit performing the functionality of the device receiver 92 and the device transmitter 94. It will be appreciated by one of ordinary skill in the art that other similar electronic block diagrams of the same or alternate type can be utilized for the wireless communication device 32 to handle the requirements of the wireless communication device 32.

The wireless communication device 32 includes all the elements and functionality illustrated in FIGS. 2 and 3 and further preferably comprises a global positioning satellite (GPS) receiver 79 and GPS antenna 83.The Global Positioning System (GPS) is a worldwide radio-navigation system formed from a constellation of 24 satellites and their ground stations. GPS receivers use these satellites as reference points to calculate positions accurate to a matter of meters. The GPS receiver 79 receives signals 81 broadcasted from a GPS system 77. The device processor 98 processes the received signals 81, in a manner well known in the art, to calculate the location of the wireless communication device 32.

The GPS receiver 79 is coupled to the device processor 98. The device processor 98 is coupled to the device memory 100, which in response to receiving a command that includes information from the GPS receiver, stores the current location 122, preferably in the form of a latitude and longitude, along with the current speed 124 and the current direction 126, in the current information 111 portion of the device memory 100. The current location 122 can be determined from the processing of the plurality of signals 81 in the device memory 100 for later use by the device event management application 108. The GPS receiver 79 provides an accurate method for the wireless communication device 32 to determine the current location 122. Once the current location 122 is determined, the current speed 124 and the current direction 126 may also be calculated by using predetermined algorithms, as is well known in the art. The current speed 124 and the current direction 126 may then be stored in the device memory 100.

Figure 4:
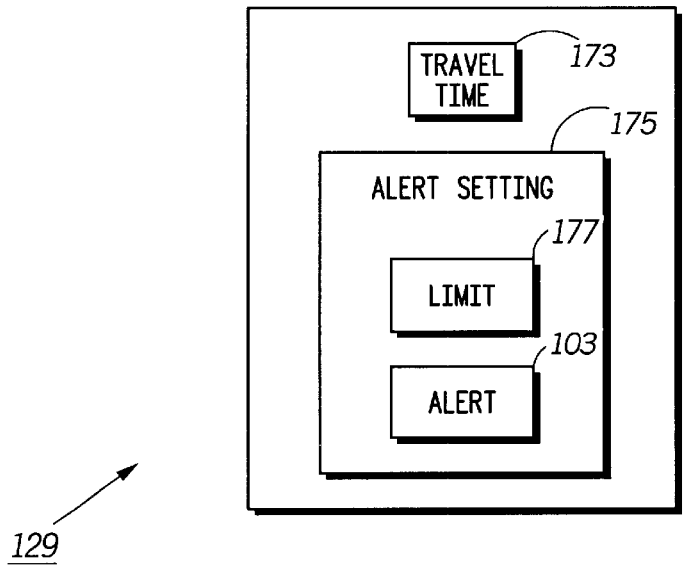
FIG. 4 illustrates one embodiment of event criteria parameters for use within the wireless communication device of FIGS. 2 and 3.

As illustrated in FIG. 4, the event criteria parameters 129 can include a travel time 173, an alert setting 175, a limit 177, and an alert 103. The travel time 173 can be a length of time in minutes, for example. The alert setting 175 can be a combination of the limit 177 and the alert 103. The limit 177 is a predetermined algorithm, for example, a time of day. The alert 103 can be audible, vibratory, or visual.

Figure 5:
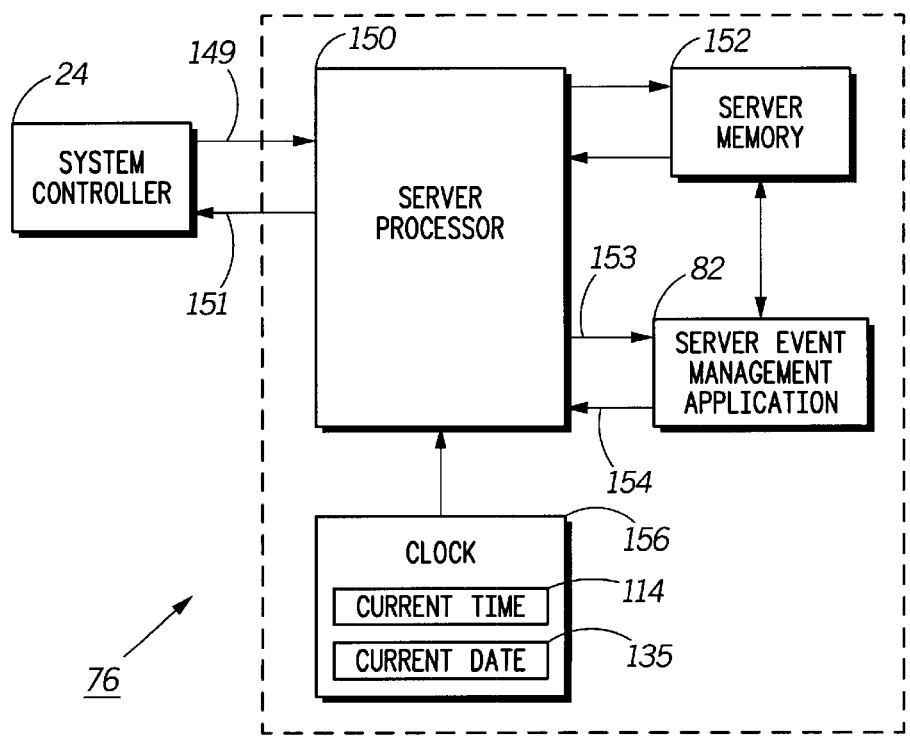
FIG. 5 is an electronic block diagram of a one embodiment of a application server for use within the wireless communication system of FIG. 1.

FIG. 5 is an electronic block diagram of a preferred embodiment of the application server 76 for use within the wireless communication system 10 in accordance with the present invention. In this embodiment, the modifications to the event schedule 80 are made within the application server 76 rather than the device. The application server 76 includes a server processor 150, a server memory 152, a server event management application 82, and a server clock 156.

As illustrated in FIG. 5, the server processor 150 is coupled to the system controller 24 of the wireless communication system 10. The server processor 150 intercepts signals such as the server input 149, which can be for example a system request 86 from the system controller 24. The server processor 150 also sends server outputs 151 such as the server command 84 which can be, for example, change notification messages or messages to a backup wireless communication device 47 via the server interface 78 in response to receiving a system request 86 from the system controller 24.

The server processor 150 utilizes conventional signal-processing techniques for processing a received server input 149 such as the system request 86. Preferably, the server processor 150 is similar to the MC68328 micro-controller manufactured by Motorola, Inc. of Schaumburg, Ill. It will be appreciated that other similar processors can be utilized for the server processor 150, and that additional processors of the same or alternative type can be added as required to handle the processing requirements of the server processor 150.

To perform the necessary functions of the application server 76, the server processor 150 is coupled to the server memory. 152, which preferably includes a random access memory (RAM), a read-only memory (ROM), and an electrically erasable programmable read-only memory (EEPROM)(not shown). The server memory 152 also includes the applicable information about the plurality of wireless communication devices 40.

Preferably, the application server 76 includes the server clock 156. The server clock 156 provides timing for the server processor 150. The server clock 156 can include the current time 114 and the current date 135 for use in the operation of the application server 76.

In a preferred embodiment, the application server 76 includes the server event management application 82. The application server 76 performs event scheduling functions and management within the server event management application 82, using a server processor command 153 sent from the server processor 150. The server event management application 82 sends a server application response 154 in reply to the server processor command 153. The server event management application 82 preferably includes the backup list 85 and the event schedule 80. The server event management application 82 can be hard coded or programmed into the application server 76 during manufacturing, can be programmed over-the-air upon customer subscription, or can be a downloadable application. It will be appreciated by one of ordinary skill in the art that other programming methods can be utilized for programming the server event management application 82 into the application server 76.

The event schedule 80 identifies the device user 68 and the wireless communication device 32 for a particular event. In one embodiment, the server processor 150 receives the current time 114 from the server clock 156 and sends the server processor command 153 including the current time 114 and the current date 135 to the server event management application 82. The server event management application 82 compares the value of the current time 114 to a current information 111 (FIG. 6) for the wireless communication device 32 as defined by the event schedule 80, and sends the response when there is a match.

Figure 6:
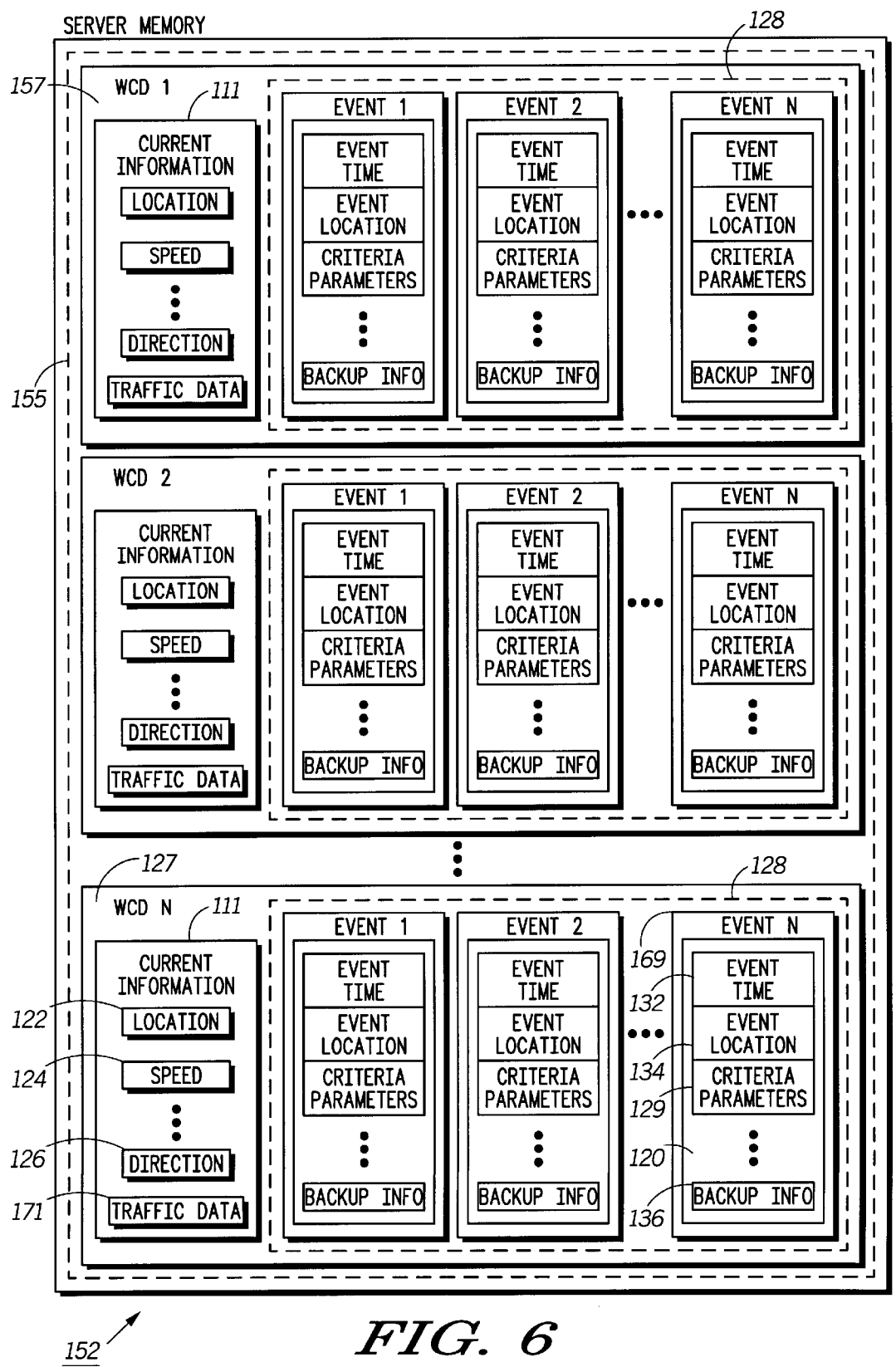
FIG. 6 illustrates one embodiment of a server memory for use in the application server of FIG. 5.

FIG. 6 is an electronic block diagram of a preferred embodiment of the server memory 152 for use in the application server 76 of FIG. 5. The server memory 152 is coupled to the server processor 150 and the server event management application 82, from which it receives commands for data. Preferably, the server memory 152 consists of a plurality of device information data slots 155 corresponding to the plurality of wireless communication devices 40, each device information data slot 157 containing their current information 111, as well as, a plurality of events 128. For example, the Nth information data slot 127 contains a current information 111, including a current location 122, a current speed 124, a current direction 126, and traffic data 171. It also contains a plurality of events 128. Each event 169, within the plurality of events 128, contains event information 120. The event information 120 includes an event time 132, an event location 134, an event backup information 136, and event criteria parameters 129, received from either the schedule manager 12 or from the wireless communication device 32.

Figure 7:
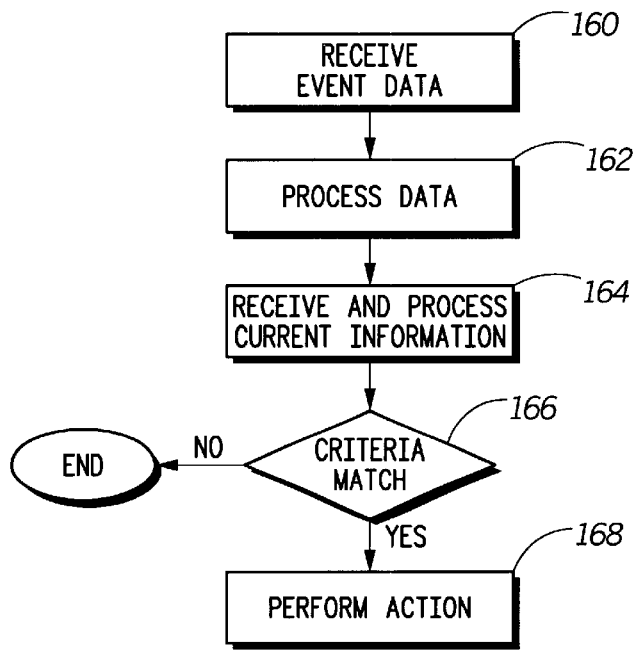
FIG. 7 is a flowchart illustrating the operation of a application server for use within the wireless communication system of FIG. 1 in accordance with the present invention.

FIG. 7 is a flowchart illustrating the operation of the application server 76 within the wireless communication system 10 of FIG. 1 in accordance with the present invention. In Step 160, the application server 76 receives event information 120 which can, for example, include the event time 132, the event location 134, the event backup information 136, and event criteria parameters 129. Next, in Step 162, the event information 120 is processed by the server event management application 82 and passed to the server memory 152 for storage as event information 120. Next, in Step 164, the application server 76 receives and processes the current information 111 of the wireless communication device 32 and stores the current information 111 in the current information 111 memory of server memory 152. Next, in Step 166, the event information 120 and current location 122 of the wireless communication device 32 are compared to the event criteria parameters 129. This comparison is done by the server event management application 82. When the event information 120 and the current location 122 do not match the event criteria parameters 129 in Step 166, the process ends. When the event information 120 and the current location 122 match the event criteria parameters 129, the process proceeds to Step 168. In Step 168, the predetermined action for this event is performed. The predetermined action can be the determination of which backup device user 74 having a backup wireless communication device 47 is able to attend the event. This determination can include retrieving the backup list 85 and determining the current location 122 of each backup wireless communication 47. Once a backup device user 74 is found and identified, a call or message can be sent to the backup wireless communication device 47. The call or message can indicate to the backup device user 74 that they will need to attend the an upcoming scheduled event. The call or message can also include the event information 120 which can be stored in the backup wireless communication device 47. Additionally, an update message 36 can be sent to the wireless communication device 32 to indicate to the device user 68, via the alert circuit 102 and/or display 104, that a match has occurred in Step 166, and that the device user 68 is possibly in a location too far from the upcoming event to allow the device user 68 to attend. The update message 36 can include the time of the upcoming scheduled event, the calculated distance from the event and the calculated time required to reach the event.

Figure 8:
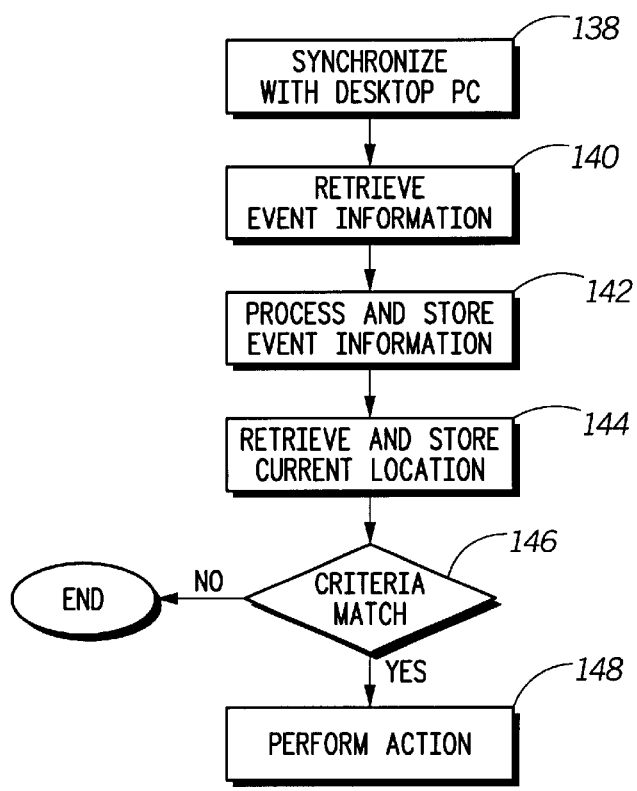
FIGS. 8 and 9 are flowcharts illustrating the operation of the wireless communication device of FIGS. 2 and 3 in accordance with the present invention.

FIG. 8 is a flowchart illustrating the operation of the wireless communication device 32 of FIGS. 2 and 3 within the wireless communication system 10 of FIG. 1 in accordance with the present invention. In Step 138, the wireless communication device 32 is synchronized with a computer 16. The synchronization allows the device user 68 to obtain the event information 120 for each of the plurality of events 128. Next in Step 140, the wireless communication device 32 receives the event information 120 including the event time 132, the event location 134, the event backup information 136, and the event criteria parameters 129. Next, in Step 142, the event information 120 is processed and stored. The device processor 98 processes the event information 120 and sends the processed event information 120 to the device memory 100 for storage. Next, in Step 144, the current location 122 is retrieved and stored in the device memory 100. The current location 122 is determined by receiving signals 81 through the GPS antenna 83 and the GPS receiver 79, which are then sent to the device processor 98 where they are processed, and passed to the device memory 100 for storage. Next, in Step 146, the event information 120 is passed from the device memory 100 to the device event management application 108. The device event management application 108 compares the event information 120 to the event criteria parameters 129, checking for a match. When no match is detected, the process ends. When a match is detected the process proceeds to Step 148. In Step 148, a predetermined action is performed. Such actions could include indicating to the device user 68, via the alert circuit 102 and/or the display 104, that an upcoming scheduled event is approaching and that the distance from the upcoming scheduled event has reached a point where it may not be possible for the device user 68 to attend the scheduled event. The device user 68 may then be prompted to initiate a call or message to a backup device user 74 having a backup wireless communication device 47. Alternately, the wireless communication device 32 could display the calculated distance between the current location 122 of the wireless communication device 32 and the upcoming scheduled event and the calculated amount of time needed to reach the event location 134. The device user 68 could then decide whether any other action needs to be taken in Step 148.

Figure 9:
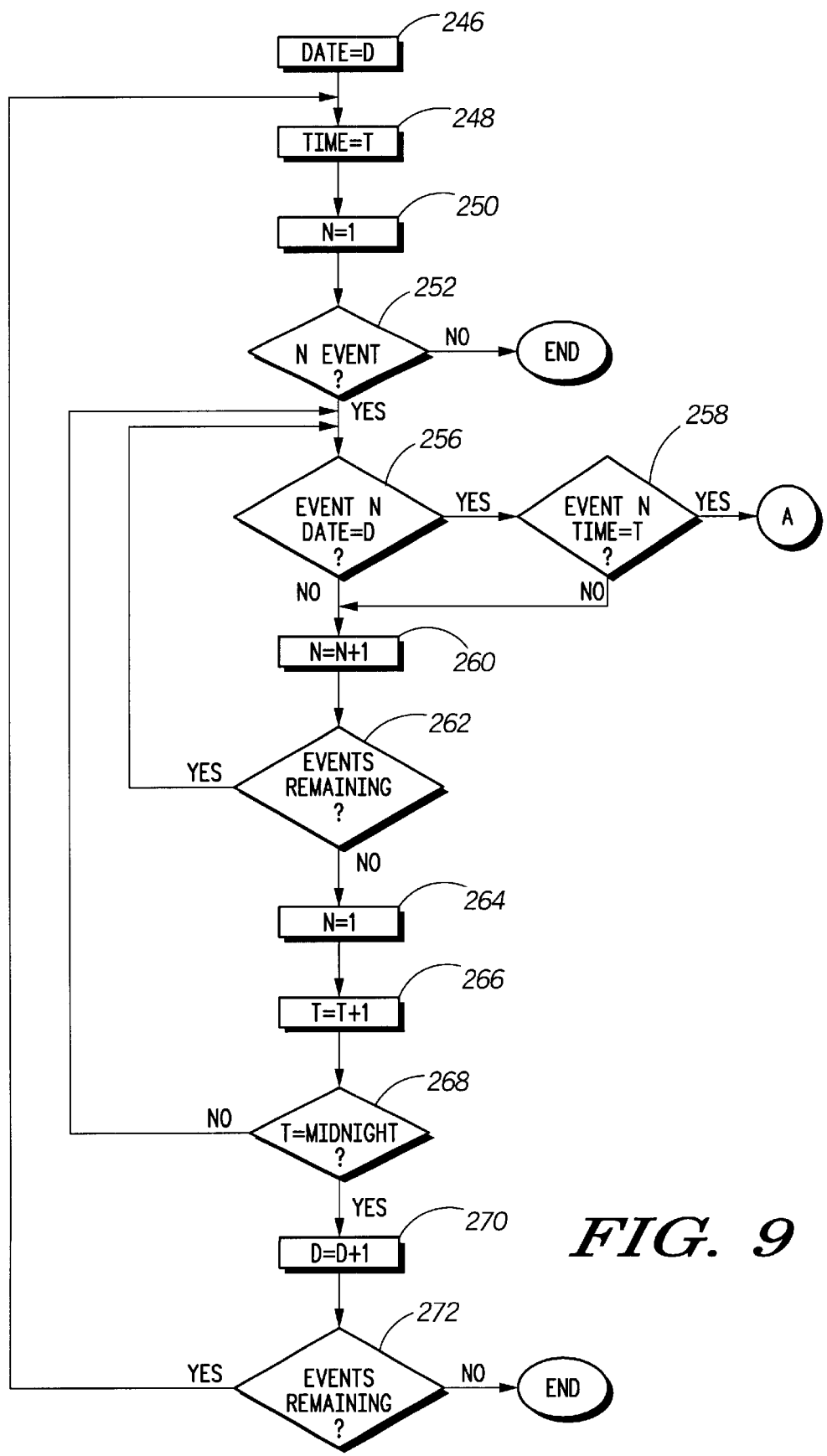

FIG. 9 is a flowchart illustrating more detail of the operation of the wireless communication device 32 of FIGS. 2 and 3 in accordance with the present invention. In Step 246, the date is initialized in the device event management application 108 to the current date 135. Next, in Step 248, the time is initialized in the device event management application 108 to the current time 114. Next, in Step 250, a counter is set to N=1. Next, in Step 252, the device event management application 108 checks that there are any events scheduled. When there are no events scheduled the device event management application 108 stops checking for events. In Step 256, when there are events scheduled, the device event management application 108 compares the event date 137 to the current date 135. In Step 258, when the event date 137 matches the current date 135, the event time 132 is then compared to the current time 114. When the event time 132 is equal to the current time 114, the process proceeds to node "A", illustrated in FIG. 11. When the event time 132 is not equal to the current time 114, the process continues to Step 260.

In Step 260, the counter N is incremented to N=N+1. In Step 262, the event schedule 80 is checked for remaining events. When there are events remaining, the process returns to Step 256 and continues comparing the current date 135 to the event date 137 of the remaining events. In Step 264, when there are no events remaining in the event schedule 80, the counter is reset to N=1. Next, in Step 266, the current time 114 is incremented by a specified number of minutes, for example 30 minutes, meaning that 30 minutes has passed and the current time 114 is 30 minutes later. Next, in Step 268, the current time 114 is compared to midnight. When the current time 114 is not equal to midnight, the process returns to Step 256 and continues comparing the current date 135 with the event date 137 of the remaining events. Next, in Step 270, when the time is equal to midnight, the date in the device event management application 108 is incremented by one calendar day. Next in Step 272, the device event management application 108 checks that there are any events remaining on the schedule. When there are events remaining on the device event management application 108 schedule, the process returns to Step 248. When there are no events remaining on the device event management application 108 schedule, the device event management application 108 stops checking for events.

In summary, the method described in FIG. 9, in accordance with the present invention, compares the current date 135 to the event date 137 and the current time 114 to the event time 132 to determine when an alert should be made. This method also maintains a counter and checks it to determine when there are no more events remaining.

FIG. 10 is an example of the display of information recorded for an event. FIG. 10 represents the display utilized by a schedule manager 12 or by any one of the plurality of wireless communication devices 40. The display of a sample event reminder 208 for an event includes a date 209, a start time 232, an end time 234, an event title 216, a location 218, a latitude 222, a longitude 220, an average speed 236, an alert time 224, a contact phone number 238, a list of backup names, and a list of backup phone numbers. The date 209 of the event includes a month 210, a day 212, and a year 214, Sep. 21, 2000 for example. An example of the information for an event would be: the event title 216, Tom Weiss Retirement Luncheon, at location 218, the Bain Hotel in Ballroom A, with a latitude 222 of 28.14 degrees and a longitude 220 of 82.35 degrees. The luncheon has a start time 232 at 12:00 p.m. and end time 234 at 2:00 p.m. on the date 209, Sep. 21, 2000. The average speed 236 is 45 miles per hour (72.42 kilometers per hour) and the alert time 224 is set to 30 minutes before the start time 232. There are three backups listed, backup #1's name 226 is Peter Joseph and backup #1's phone 240 is 561-968-2703, backup #2's name 228 is Cindy Johnson and backup #2's phone 242 is 561-639-7444, and backup #3's name 230 is Mike Ellis and backup #3's phone 244 is 561-223-5500. The display shown in FIG. 9 is one representation of the type and form of information which is to be displayed to a user in the preferred embodiment. Other variations of displayable information can be used without departing from the invention described herein.

Figure 11:
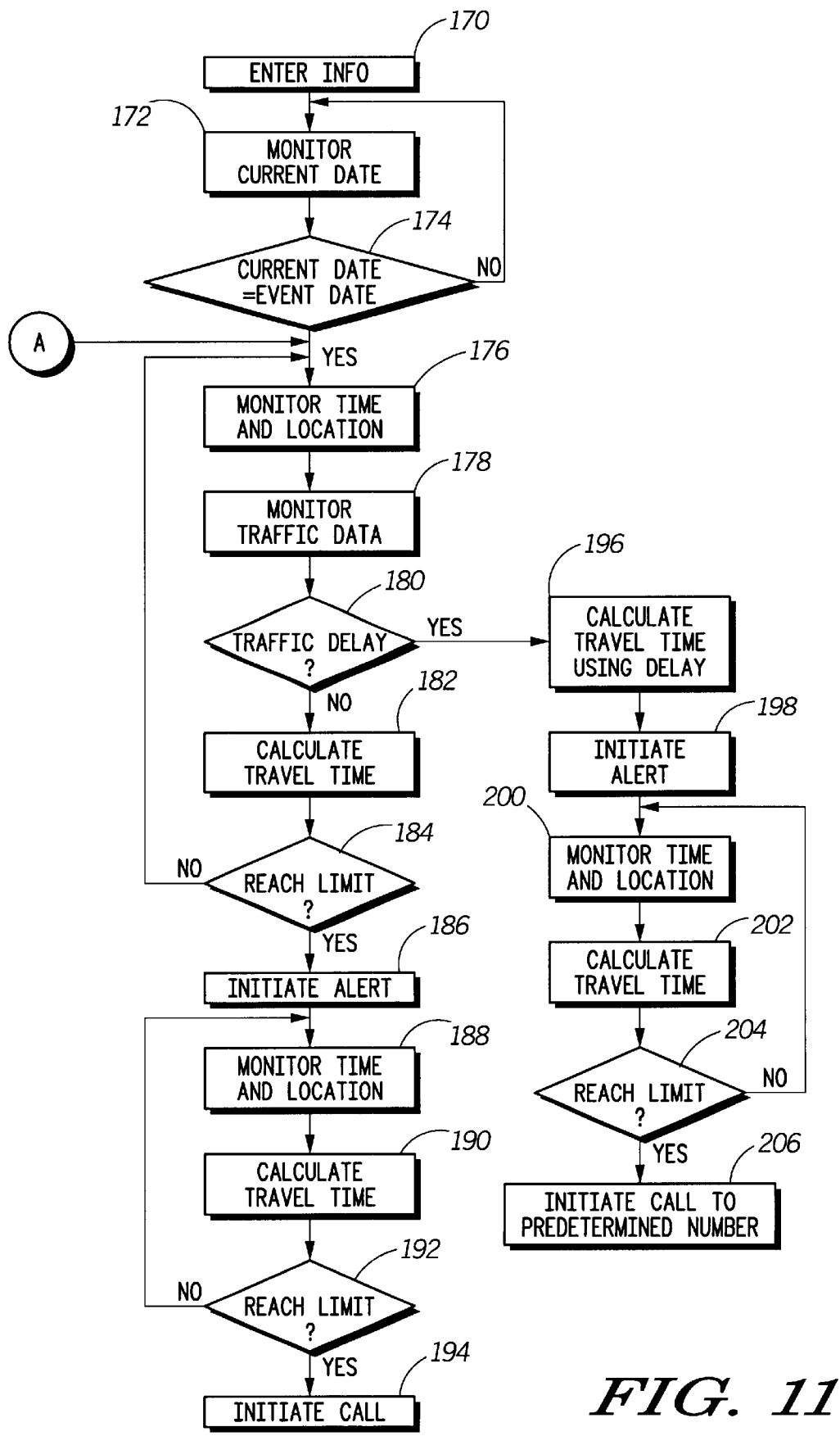
FIGS. 11 and 12 are flowcharts illustrating the operation of the wireless communication device of FIGS. 2 and 3 in accordance with the present invention.

FIG. 11 is a flowchart illustrating more detail of the operation of the wireless communication device 32 of FIGS. 2 and 3 in accordance with the present invention. FIG. 11 illustrates the further operation of the device event management application 108 when the predetermined action is to place a call to the event contact person based on the location of the wireless communication device 32. In Step 170, the device event management application 108 retrieves event information 120 from the device memory 100. Next, in Step 172, the current date 135 is monitored. Next, in Step 174, the current date 135 is compared to the event date 137. When the event date 137 does not match the current date 135, then the process returns to Step 172. In Step 176, when the event date 137 matches the current date 135 or the process of FIG. 9 continues, the event time 132 and the event location 134 are monitored. In Step 178, the traffic data 171 (FIG. 3) is monitored. Next, in Step 180, the traffic data 171 is checked for a delay. In Step 182, when no traffic delay is detected, the travel time 173 is then calculated to determine how long it will take to get to the event location 134. In Step 184, the travel time 173 (see FIG. 4) is then compared to the alert setting 175 to check that the limit 177 has been reached. If the limit 177 has not been reached, the process returns to Step 176. The process continues to Step 186 when the limit has been reached, and the device event management application 108 sends the application response 118 to the device processor 98 to initiate an alert to the device user 68. The alert 103 is initiated by the device processor 98 sending a command to the alert circuit 102. After an alert has been initiated and sent, in Step 188, the current time 114 and current location 122 of the device is monitored. Next, in Step 190, the travel time 173 is again calculated. Next, in Step 192, the travel time 173 is compared to the alert setting 175 to check that the limit 177 has been reached. When the limit 177 has not been reached, the process returns to Step 188. The process continues to Step 194 when the limit 177 has been reached, and the device event management application 108 sends the application response 118 to the device processor 98 to initiate a call or send a message to the contact phone number 238 of FIG. 10, which is the predetermined contact person for the event. This call or message, for example, notifies the contact person that the device user 68 will either be late for the event or will not be able to make it. This process frees the device user 68 from having to locate the contact phone number 238 and dial the number or send a message when it is determined that the user is in jeopardy of not being able to attend the upcoming scheduled event.

In Step 196, when a traffic delay exists, the travel time 173 is calculated including the traffic delay. In Step 198, the device event management application 108 sends the application response 118 to the device processor 98 to initiate a notification to the device user 68 with the traffic delay information. In Step 200, the current time 114 and the current location 122 of the wireless communication device 32 is monitored. In Step 202, the travel time 173 is calculated. In Step 204, the travel time 173 is compared to the alert setting 175 to check that the limit 177 has been reached. If the limit 177 has not been reached, the process returns to Step 200. In Step 206, when the limit 177 has been reached, the application response 118 is sent to the device processor 98 to indicate that a call or message is to be initiated. The call is made or the message is sent to the contact phone number 238 alerting the event contact person of a possible delay. This call, for example, notifies the contact person that the device user 68 is either stuck in traffic or that there is a conflict in schedule.

Figure 12:
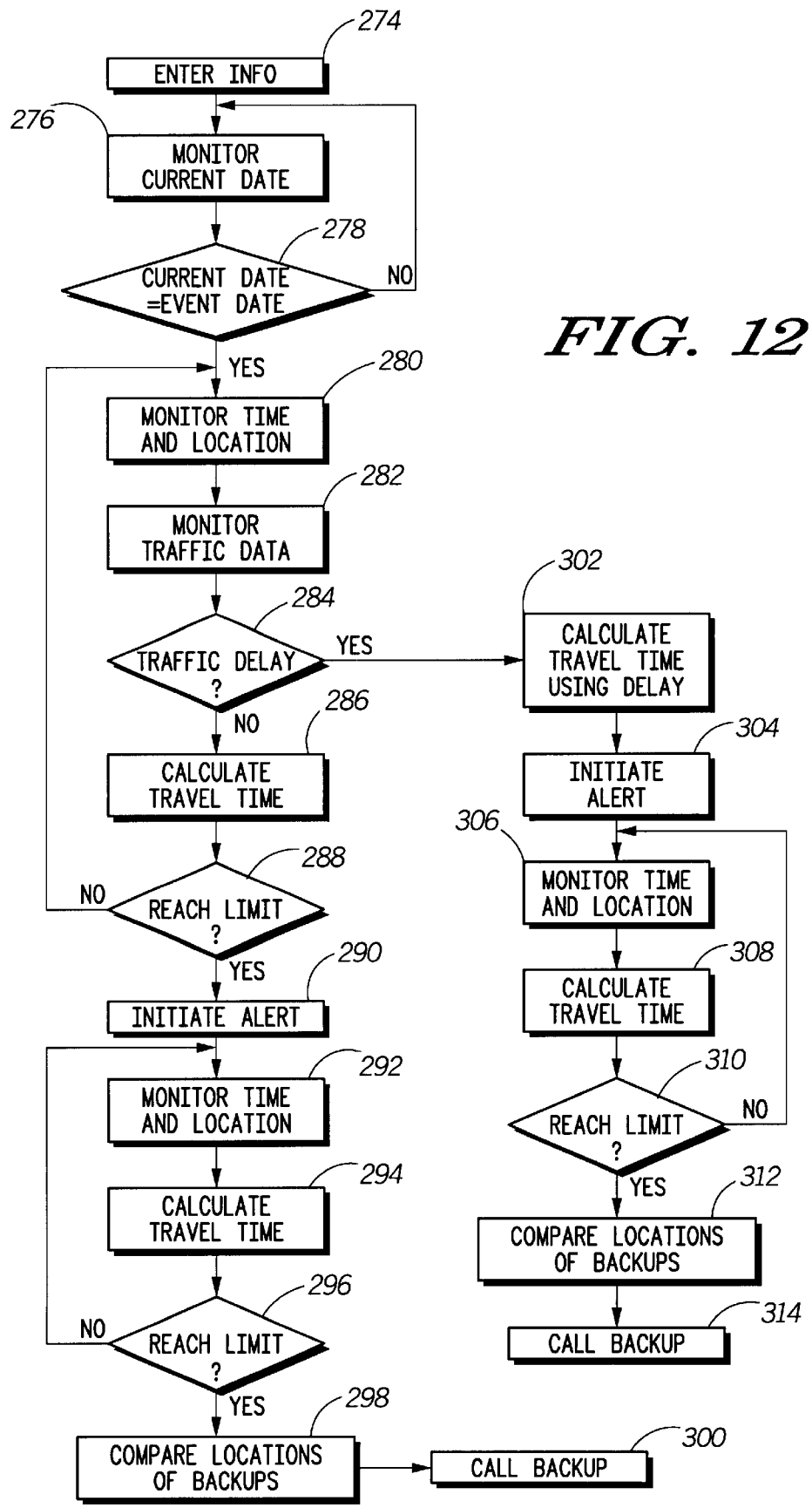

FIG. 12 is a flowchart illustrating further detail of the operation of the wireless communication device 32 of FIGS. 2 and 3 in accordance with the present invention. FIG. 12 is the further operation of the device event management application 108 when the predetermined action is to contact a backup device user 74 based on the location of the backup device user 74 as illustrated. In Step 274, the device event management application 108 retrieves the event information 120 from the device memory 100. Next, in Step 276, the current date 135 is monitored. In Step 278, the current date 135 is compared to the event date 137. When the event date 137 does not match the current date 135, the process returns to Step 276. In Step 280, when the event date 137 matches the current date 135, the event time 132 and the event location 134 are monitored. In Step 282, the traffic data 171 is monitored. Then, in Step 284, the traffic data 171 is checked for a traffic delay. In Step 286, when no traffic delay is found, the travel time 173 is then calculated to determine how long it will take to get to the event location 134. Next, in Step 288, the travel time 173 is compared to the alert setting 175 to check that the limit 177 has been reached. When the limit 177 has not been reached, the process returns to Step 280. The process continues to Step 290 when the limit 177 has been reached, and the device event management application 108 sends the application response 118 to the device processor 98 to initiate a notification to the device user 68. After the notification has been initiated and sent, in Step 292, the current time 114 and the current location 122 of the wireless communication device 32 is monitored. In Step 294, the travel time 173 is calculated. In Step 296, the travel time 173 is compared to the alert setting 175 to check whether the limit 177 has been reached. When the limit 177 has not been reached, the process returns to Step 292. The process continues to Step 298 when the limit 177 has been reached, and the device event management application 108 sends the application response 118 to the device processor 98 to retrieve and compare the current location 122 of each backup device user 74 having a backup wireless communication device 47 that has been stored for the event 169. In Step 300, the backup device user 74 closest to the event is determined, and a message or call is sent the backup wireless communication device 47. This call or message, for example, notifies the backup device user 74 that the device user 68 will either be late for the event 169 or will not be able to make it, and instructs the backup device user 74 to attend the upcoming scheduled event. Additionally, the call or message can include the event information 120 which can be received and stored by the backup wireless communication device 47.

In Step 302, when a traffic delay exists, the travel time 173 is calculated including the traffic delay. In Step 304, the device event management application 108 sends the application response 118 to the device processor 98 to initiate a notification to the device user 68 with the traffic delay information. In Step 306, the current time 114 and current location 122 of the wireless communication device 32 is monitored. In Step 308, the travel time 173 is again calculated. In Step 310, the travel time 173 is compared to the alert setting 175 to check whether the limit 177 has been reached. When the limit 177 has not been reached, the process returns to Step 306. In Step 312, when the limit 177 has been reached, the application response 118 is sent to the device processor 98 to retrieve and compare the current location 122 of each backup device user 74 that have been specified for the event 169. In Step 314, the backup device user 74 closest to the event location 134 is determined, and a message or call is sent the backup wireless communication device 47. This call, for example, notifies the backup device user 74 that the device user 68 will either be late for the event 169 or will not be able to make it.

In summary, the present invention as described in FIGS. 11 and 12 includes a method for assuring that a user is alerted of an impending scheduled event. The detection and notification of traffic delays are also handled using this method and predetermined actions are taken should the user not be able to attend the scheduled event.

Figure 13:
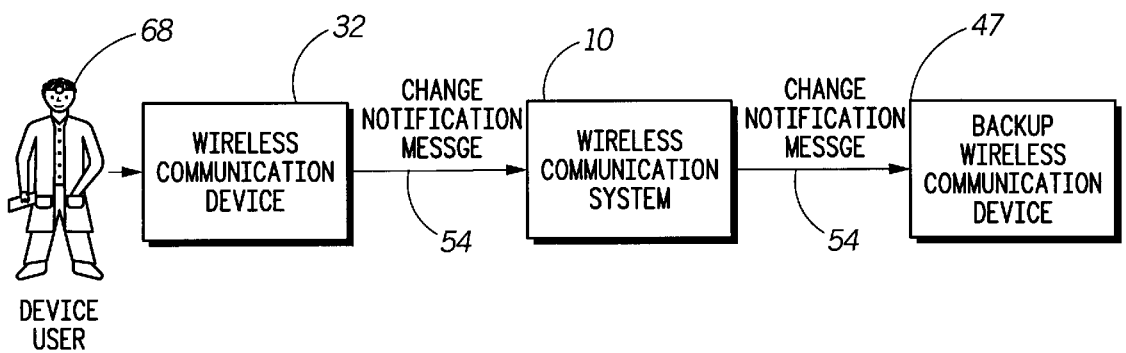
FIG. 13 illustrates the operation of one embodiment of FIGS. 2 and 3 in accordance with the present invention.

FIG. 13 is an operational diagram of the operation of the wireless communication device 32 of FIGS. 2 and 3 in accordance with the present invention. In this embodiment, an emergency occurs and the device user 68 cannot attend the event 169. The device user 68 contacts a backup device user 74 having a backup wireless communication device 47 either by placing a call or sending a change notification message 54. For example, the device user 68 can send the message to inform a backup device user 74 of an illness or an emergency that has come up. The change notification message 54 is initiated within the wireless communication device 32 by the device user 68. The device processor 98 processes the change notification message 54, then sends the message to the message memory 112 located within the device memory 100, to be stored. The device processor 98 then accesses the device memory 100 to obtain the event backup information 136. A backup list 85 is retrieved by the device processor 98 from the device memory 100 and sent to the display 104. The device user 68 then picks the backup device user 74 that is to receive the message. The user interface 106 sends the response to the device processor 98 which then accesses the address memory 110 and retrieves the backup address 66 of the backup wireless communication device 47. The backup address 66 is then sent back to the device processor 98 and the change notification message 54 is sent to the wireless communication system 10 via the device transmitter 94. The wireless communication system 10 transmits the change notification message 54 via the RF transmitter 26 to the backup wireless communication device 47. The change notification message 54 can also contain the event criteria parameters 129 which is then stored in the backup wireless device 47.

The present invention as described herein permits the managing of the event schedule by a wireless device user wherein the current location of the device user is utilized to determine if the user will be able to attend a scheduled event. If the user is unable to attend the scheduled event, in the case where the user is too far from the event location, a pre-defined list of backup attendees will be utilized to locate a backup device user who is close enough to the location of the scheduled event to attend the event in place of the originally scheduled user. Alternatively, utilizing the current location of a user, it is determined that a user is unable to attend an upcoming scheduled event on time, the user's device will place a call or send a message to a predetermined contact to indicate that the user will be late or unable to attend. In addition, this flexibility allows changes and variations in the management of the event schedule, without requiring a complex communicative process. Finally, the invention allows the device users options in dealing with changes and updates to the event schedule by including the device user's current location and the location of the future event within both the server and the device. The handling of the event schedule is either performed within the server event management application or the device event management application.

Although the invention has been described in terms of preferred embodiments, it will be obvious to those skilled in the art that various alterations and modifications may be made without departing from the invention. For example, the current location of a wireless communication device may be calculated by and received from the wireless communication system without the need for a GPS receiver included within the wireless devices. Such well known techniques would include triangulation using time delay measurements as is well known in the art. Alternatively, the current location coordinates can be obtained via a shared location calculation technique known as server assisted GPS location. In this well known system, the wireless device is equipped with a GPS receiver which receives signals and performs minimal processing before providing the signals to the system controller. System controller then further processes the signals received from wireless device to calculate the location of wireless device. The calculated location coordinates are then provided back to the wireless device for use in the location based schedule management technique disclosed herein. Accordingly, it is intended that all such alterations and modifications be considered as within the spirit and scope of the invention as defined by the appended claims.

What is claimed is:

1. A wireless communication system for location based schedule management having a plurality of wireless communication devices, the plurality of wireless communication devices including a wireless communication device and a backup wireless communication device, the wireless communication system comprising:

a system controller for generating a message;

at least one radio frequency transmitter coupled to the system controller for transmitting the message to the plurality of wireless communication devices including the wireless communication device and the backup wireless communication device; and an application server coupled to the system controller, wherein the application server comprises:
a server memory for storing an event information including an event location
a server processor for receiving and processing a current location of the wireless communication device; and
a server event management application for comparing the current location of the wireless communication device with the event information including the event location,
wherein the server processor sends a server command to the system controller in response to the comparing of the current location and the event information including the event location producing a match,
wherein the system controller sends a message to the backup wireless communication device in response to the server command from the application server.

2. A wireless communication system for location based schedule management as recited in claim 1 further comprising:

at least one radio frequency receiver coupled to the system controller for receiving a response message sent from the backup wireless communication device and communicating the response message to the system controller,
wherein the system controller communicates the response message to the application server, and further wherein the server command is generated by the application server in response to the receipt of the response message.

3. A wireless communication device for use within a wireless communication system for location based schedule management, the wireless communication device comprising:

a device processor for receiving and processing a current information;

a device memory coupled to the device processor for storing the current information and at least one event information, wherein the device memory comprises:
an identity of a backup wireless communication device;
a device event management program coupled to the device processor for comparing the current information with the event information, and for sending an application response to the device processor when the comparison produces a match, wherein the device processor sends a command in response to the program response; and a device transmitter coupled to the device processor for transmitting a message in response to the command from the device processor, wherein the transmitted message includes the identity of the backup wireless communication device.

4. A wireless communication device for use within a wireless communication system for location based schedule management, the wireless communication device comprising:

a device processor for processing an event information and a current location;

a device memory coupled to the device processor for storing the event information, the current location, and an identity of a backup wireless communication device;

a device clock coupled to the device processor, wherein the device clock includes a current time;

a device event management program coupled to the device processor for comparing the event information, the current location and the current time, and for sending a program response to the device processor when the comparison produces a match, wherein the device processor sends a command in response to the program response; and a device transmitter coupled to the device processor for sending a message including the identity of the backup wireless communication device in response to the command from the device processor.

5. A method for processing an event information within a wireless communication device having a device processor, a device memory, a device event management program and a device transmitter, the method for processing event information comprising:

receiving and processing the event information and a current location by the device processor;

storing the processed event information and the processed current location within the device memory;

generating a current time;

comparing the stored event information and the stored current location with the current time by the device event management program;

sending a program response by the device event management program to the device processor when the comparison step produces a match;

selecting a backup wireless communication device in response to the match; and transmitting a message including an identity of the backup wireless communication device by the device transmitter.

6. A method for location based schedule management within a wireless communication system having a system controller, a wireless communication device, and a backup wireless communication device, the method comprising:

in the wireless communication device:
receiving and processing the event information and a current location by the device processor;
storing the processed event information and the processed current location within the device memory;
generating a current time;
comparing the stored event information and the stored current location with the current time by the device event management program;
sending a program response by the device event management program to the device processor when the comparison step produces a match;

selecting a backup wireless communication device in response to the match;
transmitting a message including an identity of the backup wireless communication device by the device transmitter;

in the system controller:
receiving the message including the identity of the backup wireless communication device;
determining a current location of the backup wireless communication device; and
transmitting a message to the backup wireless communication device when the current location of the backup wireless communication device is within a predetermined value.

7. A method for location based schedule management within a wireless communication system having an application server, a system controller, a transmitter, a wireless communication device, and a backup wireless communication device, a method for location based schedule management comprising:

in the application server:
receiving and processing an event information and a current location for the wireless communication device by a server processor;
storing the processed event information and the processed current location within a server memory;
generating a current time;
comparing the stored event information and the stored current location with the current time;
providing an indication when the comparison step produces a match;
selecting a backup wireless communication device in response to the indication of a match;
determining a current location of the backup wireless communication device;
sending a server command to the system controller when the current location of the backup wireless communication device is within a predetermined value;

in the system controller:
generating a message including the address of the backup wireless communication device in response to receiving the server command; and in the transmitter:
transmitting the message to the backup wireless communication device.

8. A method for location based schedule, management within a wireless communication system as recited in claim 7 further comprising:

transmitting a message to the wireless communication device.

9. A method for location based schedule management within a wireless communication system as recited in claim 7 wherein the wireless communication system further includes a second backup wireless communication device, the method further comprising:

in the application server:
selecting the second backup wireless communication device in response to the current location of the backup wireless communication device not being within the predetermined value;
determining the current location of the second backup wireless communication device; and
sending the server command when the current location of the second backup wireless communication device is within the predetermined value.

* * * * *